United States Patent [19]

Hirakawa et al.

[11] 4,373,566

[45] Feb. 15, 1983

[54] PNEUMATIC RADIAL TIRE HAVING A REDUCED ROLLING RESISTANCE

[75] Inventors: Hiroshi Hirakawa, Musashino; Akio Sato, Higashimurayama; Takashi Takusagawa, Ohme; Nobumasa Ikeda, Kodaira, all of Japan

[73] Assignee: Bridgestone Tire Co., Ltd., Tokyo, Japan

[21] Appl. No.: 270,206

[22] Filed: Jun. 3, 1981

[30] Foreign Application Priority Data

Jun. 17, 1980 [JP] Japan ................................ 55-80892

[51] Int. Cl.³ ........................ B60C 9/18; B60C 13/00
[52] U.S. Cl. ................................ 152/353 G; 152/360; 152/361 R; 152/374
[58] Field of Search ............... 152/374, 353 R, 353 C, 152/353 G, 360, 352 R, 361 R

[56] References Cited

U.S. PATENT DOCUMENTS

| | | | |
|---|---|---|---|
| 3,253,635 | 5/1966 | Travers | 152/354 |
| 4,006,766 | 2/1977 | Tagayanagi et al. | 152/374 |
| 4,274,462 | 6/1981 | Ogawa et al. | 152/374 |
| 4,285,381 | 8/1981 | Furukawa et al. | 152/374 |

FOREIGN PATENT DOCUMENTS

| | | | |
|---|---|---|---|
| 2403924 | 8/1974 | Fed. Rep. of Germany | 152/360 |
| 56-79004 | 6/1981 | Japan | 152/374 |
| 1067856 | 5/1967 | United Kingdom | 152/360 |

Primary Examiner—Michael W. Ball
Attorney, Agent, or Firm—Sughrue, Mion, Zinn, Macpeak & Seas

[57] ABSTRACT

A pneumatic radial tire having a reduced rolling resistance and particularly suitable for a passenger car, comprising a toroidal carcass, a belt layer, a bead core, a side rubber, a tread rubber, a relatively thin base rubber, and a rubber filler, wherein provision is made of a stress relieving groove composed of a depression facing toward the bead rubber at a position near the joint portion between the side rubber and the tread rubber, the base rubber having a resilience which is higher than those of the tread rubber and the bead rubber.

8 Claims, 3 Drawing Figures

PNEUMATIC RADIAL TIRE HAVING A REDUCED ROLLING RESISTANCE

BACKGROUND OF THE INVENTION

1. Field of the Invention

This invention relates to a pneumatic radial tire having a reduced rolling resistance and particularly suitable for a passenger car.

2. Description of the Prior Art

In general, a radial tire comprises a carcass body reinforcement which consists of a toroidal carcass composed of plies including radially arranged cords, that is, cords arranged in a radial plane inclusive of a rotary axis of the tire or a plane inclined at a small angle to the radial plane and crossed therewith. Also a plurality of belt layers are superimposed about the crown portion of the carcass and include cords inclined at an angle of a range between 60° and 80° to the radial plane of the tire, the cords of adjacent belt layers being crossed with each other. A bead reinforcement consists of the lower portion of the toroidal carcass wound around a bead core to form a turn-up portion. The carcass body reinforcement and bead reinforcement are covered with outer rubber layer of the tread portion and side portion made integral with the bead portion by vulcanization.

The rolling resistance of the tire produced when a vehicle provided with the above mentioned radial tire runs on a flat paved road without inclination is produced mainly due to the internal loss caused by flexure of the tire formed during rotation of tire and the frictional loss between the tire and the road surface. In this case, the fact that the rate of the internal loss taken in the above two losses is large has been well known in the art. Many attempts have been made to use a material having a relatively low loss modulus of elasticity as the rubber for all portions exclusive of the cords.

But, the tire must display different abilities in dependence with its different positions such as the tread portion, side portion or the like. As a result, if, for example, the rubber having a low loss modulus of elasticity is applied to the tread portion and is maximized in amount, hence tending to give a maximum contribution to the ability of the tire, the frictional coefficient with the road surface considerably decreases to deteriorate the anti skid property and breaking property, thereby restricting the safety of the tire.

Means for reducing the rolling resistance of the tire comprising an annular groove arranged in the outer rubber layer of the shoulder of the tire and circumferentially extending along the tire has been proposed and described in U.S. Pat. No. 3,253,635. In this tire, the annular groove is operative to interrupt the tread portion and the side portion which are different in operation as an oscillatory system of the tire when it runs from each other. Such kind of tire, however, is the same in construction as a tire including nibbling groove which has been well known in the art and hardly displays an effect of reducing the rolling resistance. The tire including a nibbling groove is a tire which is provided at its shoulder portion with a deep annular groove circumferentially extending the tire and operative to easily deform transversely the tread portion side edge for the purpose of reducing the resistance that tends to be produced when the tire rides over in the lengthwise direction of projections slightly raised from the road surface such as a rail for street car provided along the road.

The rolling resistance of the tire exerts a direct influence upon the driving force of automobile, so that there is an urgent requirement in the tire manufacturing field to reduce considerable the rolling resistance of the tire in compliance with the requirements of economizing energy.

SUMMARY OF THE INVENTION

An object of the invention, therefore, is to provide a pneumatic radial tire having a reduced rolling resistance, which can fully satisfy the above mentioned desire required in the tire manufacturing field.

A feature of the invention is in a pneumatic radial tire comprising a toroidal carcass including radially arranged cords, a belt layer superimposed about the crown portion of the carcass and including a plurality of cord layers, each cord being inclined at an angle within a range between 60° and 80° with respect to the radial plane of the tire and each cord of adjacent cord layers being crossed with each other. A bead core has the lower end of the toroidal carcass is wound around it to form a turn-up portion. A side rubber outwardly covers a side portion and bead portion of the toroidal carcass, and a tread rubber outwardly covers the crown portion of the carcass inclusive of the belt layer and forming a joint portion with the side rubber. A relatively thin base rubber is disposed directly below the joint portion between the side rubber and the tread rubber and is superimposed about the outer surface of the carcass and belt layer and made integral therewith, and a rubber filler is disposed on the bead core and sandwiched between the carcass and its turn-up portion. A stress relieving groove is composed of a depression facing toward the base rubber at a position near the joint portion between the side rubber and the tread rubber. The base rubber has a resilience which is higher than those of the tread rubber and side rubber.

Further objects and features of the invention will fully be understood from the following detailed description with reference to the accompanying drawings, in which:

DETAILED DESCRIPTION OF THE PREFERRED EMBODIMENTS

Figure 1:
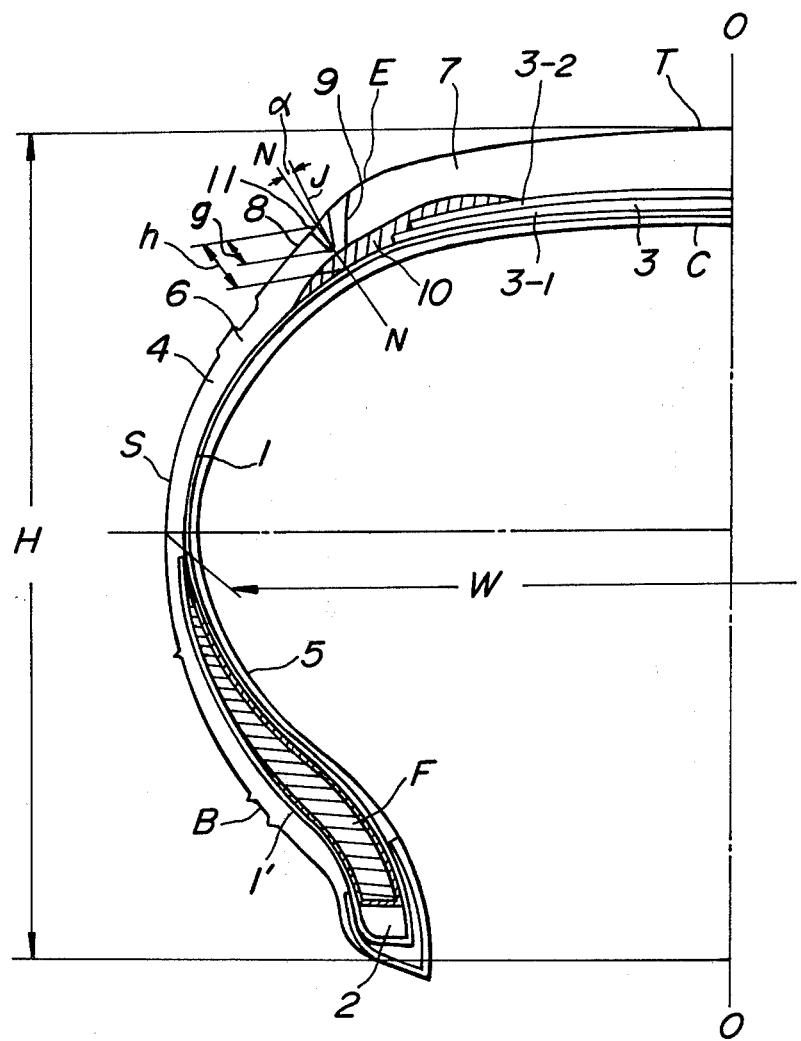
FIG. 1 is a diagrammatic sectional view of left-half of one embodiment of a pneumatic radial tire having a reduced rolling resistance according to the invention.

The tire shown in FIG. 1 is mainly composed of a tread T located at the center portion of the tire and a side portion S projecting outwardly from two side edges E, E of the tread T. FIG. 1 shows left-half of the tire for ease of illustration, but it is a matter of course that the tire is symmetrical with respect to the equatorial line O—O. Each portion of the tire is reinforced by a toroidal carcass 1 composed of plies formed of textile cords represented by polyester, nylon and rayon or the like and arranged in a radial plane of the tire, that is, a plane perpendicular or substantially perpendicular to the equatorial line O—O. The lower end of the toroidal carcass 1 is wound around a bead core 2 from the inside toward the outside thereof to form a turn-up portion 1'. FIG. 1 shows the carcass 1 composed of one ply only. But, the carcass 1 may be composed of two or more than two plies in dependence with the kind of cords and the use of the tire.

Between the carcass 1 and its turn-up portion 1' is interposed a rubber filler F extending upwardly from the bead wire 2 to a position substantially at the center of the side portion S in a conventional manner. In the present embodiment, the rubber filler F is formed of a rubber having a considerably high dynamic modulus of elasticity whose value preferably lies within a range between 300 kg/cm$^2$ and 1,5000 kg/cm$^2$.

The composition of the rubber filler having the above mentioned physical property is as follows. 100 parts by weight of a vulcanizable rubber selected from the group consisting of natural rubber, diene rubber, diene copolymer rubber and blend rubber containing the above mentioned rubber with any ratio is compounded with 5 to 30 parts by weight, preferably 8 to 30 parts by weight, more preferably 15 to 25 parts by weight of thermo-setting resin and with 0.5 to 5 parts by weight of a hardening agent for the thermo-setting resin, for example, hexamethylene tetramine. If necessary, reinforcing material, filling agent, anti-ageing agent, vulcanization accelerating agent, activating agent, softening agent, plasticizer, adhesive agent or the like used, as the conventional rubber compounding agent other than the above mentioned compounding agents may suitably be compounded with the above mentioned rubber.

As the thermo-setting resin, use may be made of phenol resin, cresol resin, or denatured resin denatured from any ratio of the above mentioned resin, for example, cashew denatured phenol resin, cashew denatured cresol resin, cresol denatured phenol resin, oil denatured phenol or cresol resin denatured with an oil such as linolic acid, linolenic acid, oleic acid or the like, or alkyl benzene denatured phenol or cresol resin denatured with alkyl benzene such as xylene, mesitylene or the like, or phenol or cresol resin denatured with rubber such as nitrile rubber or the like.

The crown portion C of the toroidal carcass 1 is reinforced by a belt layer 3 superimposed about and extending over the total width of the tread portion T. The belt layer 3 is composed of cord layers 3-1 and 3-2 formed of metal cords or textile cords having a high modulus of elasticity and inclined at an angle within a range between 60° and 80° with respect to the radial plane of the tire. These cord layers 3-1 and 3-2 being superimposed one upon the other such that the cords of the cord layer 3-1 are crossed with the cords of the cord layer 3-2 through the equatorial line O—O of the tire. As the belt cord layer, use may be made of three or more than three cord layers superimposed one upon the other. Alternatively, ply end portions may be folded to reinforce the end portion of the belt layer.

The total peripheral surface of the carcass 1 is covered at its outside with an outer rubber layer 4 and at its inside with an inner liner 5.

The outer rubber layer 4 is divided into a side rubber 6 having an excellent fatigue resistant property against extensible strain repeatedly subjected to the side portion S when the tire runs and a tread rubber T having an excellent wear resistant and anti-skid property and located at the tread portion T. The side rubber 6 is made integral with the tread rubber 7 at the joint portion 9 located at the shoulder 8 slightly outside the side edge E of the tread portion T.

The tread portion T is provided with ribs or blocks (not shown) which are divided by means of various kinds of tread grooves, a skid base having a given gauge being remained near the belt layer 3 as in the conventional manner.

In the present invention, provision is made of a relatively thin base rubber 10 arranged directly below the joint portion 9 of the side rubber 6 and superimposed about and made integral with the outer surface of the toroidal carcass 1 and belt layer 3. The base rubber 10 has a resilience which is higher than those of the side rubber 6 and tread rubber 7. The side rubber 6 is provided at a position near the joint portion 9 with the tread rubber 7 with a stress relieving groove 11 depressed toward the base rubber 10.

The base rubber 10 is made slightly thinner than the side rubber 6 and tread rubber 7 and the side edge facing the bead portion B is made wedge shaped and interposed between the side rubber 6 and the carcass 1. The base rubber 10 has a center portion between the tread rubber 7 and the carcass 1 and the side edge facing the crown center is also made wedge shaped and interposed between the tread rubber 7 and belt layer 3.

It is preferable to make the physical property of the base rubber 10 such that its resilience is higher than those of adjacent side rubber 6 and tread rubber 7, preferably within a range between 60% and 85%. In addition, the base rubber 10 has a loss modulus of elasticity of 2.0 to 12 kg/cm$^2$ which is suitable for attaining an object of the present invention.

The stress relieving groove 11 is made V-shaped in section and its base is rounded and is arranged such that it is depressed toward the base rubber 10 at a position near the joint portion 9 between the side rubber 6 and the tread rubber 7. More particularly, one sidewall of the stress relieving groove 11 is located near the joint portion 9 of the rubber and the base of the stress relieving groove 11 is spaced apart from the base rubber 10 by a thin layer of the side rubber 6.

In the embodiment shown in FIG. 1, a center line of the stress relieving groove 11, that is, a straight line J for bisecting the angle formed between opposed groove sidewalls is inclined at an angle $\alpha$ with respect to a normal line N—N which intersects the center line J at the groove base and inclined toward the crown portion of the tire. It is preferable to make the inclined angle $\alpha$ within a range between 30° and 50° in order to attain the object of the present invention.

The depth g of the stress relieving groove 11 measured along the normal line N—N drawn at the carcass line is made about 25% to 50% of the total rubber thickness h measured along the normal line N—N. If the groove depth is relatively shallow, the gauge of the base rubber 10 opposed to the groove base is made correspondingly thick. Conversely, if the groove depth is deep, the gauge of the base rubber 10 is made thin.

The width of the stress relieving groove 11 must be made wide so that the groove does not substantially close even when the tire is subjected to deformation under load when it runs. In FIG. 1, the stress relieving groove 11 is shown at one side only of the tire, but a plurality of relatively narrow grooves may be arranged side by side along the circumference of the tire. It is preferable to make the width of the stress relieving groove (the total width of these grooves if the provision is made of a plurality of stress relieving grooves side by side) within a range between 2 mm and 6 mm measured along the opening of the groove dependent on the tire side. The width of the stress relieving groove considerably larger than the above mentioned limited range has no effective function.

Now, the invention is applied to a tire in which a ratio of the tire sectional height H to the tire maximum width W is 0.5 to 0.8 and the portion of the side edge E of the tread portion T is round, that is, a so-called round shoulder tire.

Figure 2:
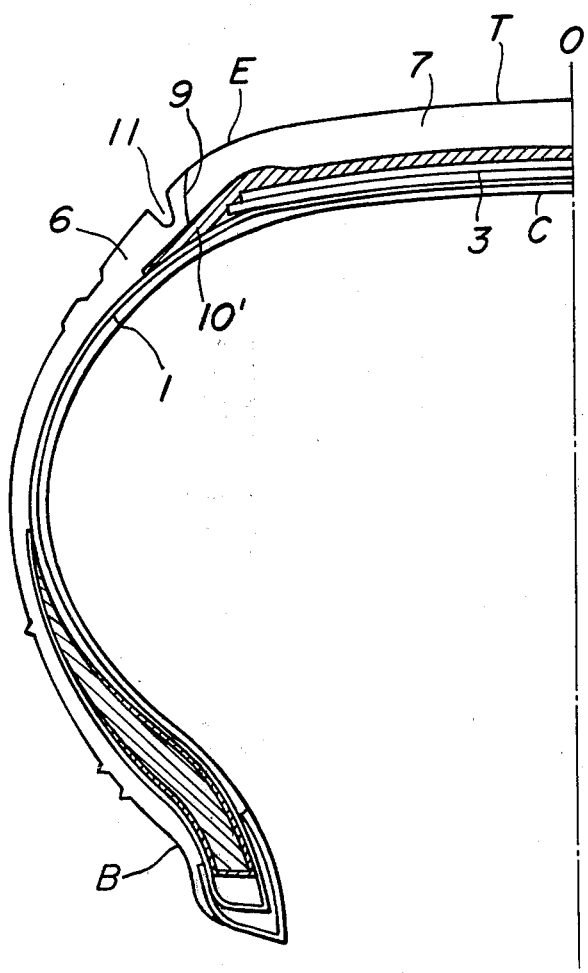
FIG. 2 is a diagrammatic sectional view of left-half of a second embodiment of a pneumatic radial tire having a reduced rolling resistance according to the invention.

In a second embodiment of a pneumatic radial tire having a reduced rolling resistance according to the invention shown in FIG. 2, the independent left and right base rubbers 10, 10 shown in FIG. 1 are connected with each other on the belt layer 3 to make a single annular base rubber 10' interposed between the belt layer 3 and the tread rubber 7. In the present embodiment, that portion of the base rubber 10' which lies at the side edge E of the tread portion T is interposed between the toroidal carcass 1 and the tread rubber 7 and that portion of the base rubber 10' which extends from the joint portion 9 between the tread and the side rubber and passes directly below the stress relieving groove 11 to the bead portion B is made wedge shaped and inserted between the toroidal carcass 1 and the side rubber 6.

Figure 3:
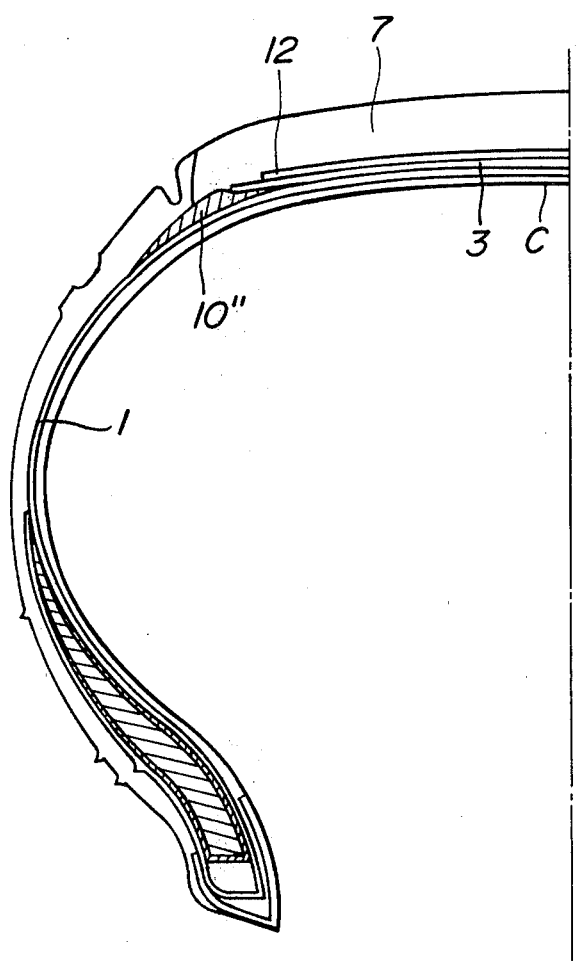
FIG. 3 is a diagrammatic sectional view of left-half of a third embodiment of a pneumatic radial tire having a reduced rolling resistance according to the invention.

In a third embodiment of a pneumatic radial tire having a reduced rolling resistance according to the invention shown in FIG. 3, the side edge of the base rubber 10'' facing the crown center is made wedge shaped and inserted between the end edge 12 of the belt layer 3 and the toroidal carcass 1. This construction is different from that of the embodiment shown in FIG. 1.

In order to confirm the effect of the tire constructed as described above according to the invention, test tires each having a size 185/70SR13 were manufactured. The test tire constructed according to the invention was compared with the test tire having the conventional construction with respect to the rolling resistance.

In the test tires, the carcass 1 was composed of two polyester cord layers of 1,500 d/2 and radially arranged. The belt layer 3 was composed of two steel cord plies inclined at 71° with respect to the radial plane and crossed with each other between adjacent plies.

The side rubber 6, tread rubber 7, base rubber 10 and stress relieving groove 11 at the shoulder portion of the tire were arranged as shown in FIG. 1. The groove depth g was made 3 mm, total rubber thickness h 8 mm (g/h=37.5%) and groove depth 5 mm. The base rubber gauge directly below the stress relieving groove 11 was made 1.5 mm.

In experimental tests, the test tire according to the invention A was compared with the test tire B having the conventional construction. The construction of the test tire according to the invention A and the conventional test tire B is shown in the following Table 1 and an example of rubber composition of the main portions of these test tires and the physical property thereof are shown in the following Table 2. In the tire according to the invention A, use was made of a filler rubber F having a dynamic modulus of elasticity of 980 kg/cm² and the conventional tire B made use of common dynamic modulus of elasticity of 180 kg/cm².

TABLE 1

| Constitutional Element | Kind of Tire | |
|---|---|---|
| | A | B |
| Stress relieving groove (11) | *o | **o |
| Base rubber (10) | o | x |

Note:
In the above table, symbol o means that the tire is provided with the stress relieving groove 11 or base rubber 10.
Symbol x means that the tire is not provided with these constitutional elements.
Symbol * means that the groove center line is inclined from the normal line at an angle α of 40.5°.
Symbol ** means that the groove center line coincides with the normal line, that is, the inclined angle α is zero.

TABLE 2

| | Tread rubber | Side rubber | Base rubber | Rubber filler |
|---|---|---|---|---|
| Rubber composition (parts by weight) | | | | |
| Natural rubber | — | 60 | 80 | 100 |
| Styrene-butadiene copolymer rubber | 80 | — | — | — |
| Polybutadiene rubber | 20 | 40 | 20 | — |
| Carbon black | | | | |
| ISAF | 75 | — | — | — |
| HAF | — | — | 38 | 75 |
| FEF | — | 48 | — | — |
| Phenol resin | — | — | — | 24 |
| Aromatic oil | 35 | 13 | 4 | 5 |
| Sulphur | 1.8 | 2 | 2.5 | 6 |
| Physical property (after vulcanization) | | | | |
| Resilience (%) | 38 | 53 | 70 | 45 |
| Loss modulus of elasticity (kg/cm²) | 30 | 8 | 8 | — |
| Dynamic modulus of elasticity (kg/cm²) | 100 | 50 | — | 980 |

Note
1. Resilience of a rubber sample of 2 mm × 8 mm × 4 ± 0.1 mm was measured by a Dunlop tripso resilience tester made by Toyo Seisakusho Co. in Japan at a normal temperature with the aid of a hammer having a weight of 60 g.
2. The loss modulus of elasticity of a strip shaped sample of a width 5 mm × depth 2 mm was obtained by calculation by measuring the loss coefficient and dynamic modulus of elasticity at a temperature of 25° C. with a number of oscillations of 50 Hz and dynamic strain of 1% by means of a viscoelastic spectrometer made by Iwamoto Seisakusho Co. in Japan.

Experimental tests have demonstrated the rolling resistance values of the tire shown in the following Table 3.

TABLE 3

| | Kind of Tire | |
|---|---|---|
| Speed | A | B |
| 50 km/h (hour) | 3.7 kg (123) | 4.8 kg (100) |
| 100 km/h (hour) | 4.2 kg (119) | 5.2 kg (100) |
| 150 km/h (hour) | 7.5 kg (109) | 8.2 kg (100) |

Similar experimental tests effected on the embodiments shown in FIGS. 2 and 3 have shown satisfactory results which were substantially the same as that described with reference to the embodiment shown in FIG. 1.

As stated hereinbefore, the pneumatic radial tire according to the invention is capable of effectively reducing the rolling resistance of the tire without deteriorating the properties generally required for such tire.

What is claimed is:
1. A pneumatic radial tire comprising;
a toroidal carcass including radially arranged cords, a belt layer superimposed about the crown portion of the carcass and including a plurality of cord layers, each cord being inclined at an angle within a range between 60° and 80° with respect to the radial plane of the tire and each cord of adjacent cord layers being crossed with each other, a bead core around which the lower end of the toroidal carcass is wound to form a turn-up portion, a rubber filler disposed on said bead core and sandwiched between the carcass and its turn-up portion; a side rubber outwardly covering a side portion and bead portion of the toroidal carcass, a tread rubber for outwardly covering the crown portion of the carcass inclusive of the belt layer and forming a joint portion with the side rubber, a relatively thin base rubber disposed directly below the joint portion between the side rubber and the tread rubber and superimposed about the outer surface of the carcass and belt layer and made integral therewith, said base rubber having a loss modulus of elasticity of 2.0 to 12 kg/cm$^2$ and its side edge portion extending to below the side rubber, and a stress relieving groove composed of a depression of the side rubber facing toward the base rubber at a position near the joint portion between the side rubber and the tread rubber and extending along the circumference of the tire.

2. A pneumatic radial tire according to claim 1, wherein said stress relieving groove is made V-shaped in section and its base is rounded and is arranged such that a straight line for bisecting the angle formed between opposed groove sidewalls is inclined toward the crown portion at an angle of at most 70° with respect to a normal line passing through the groove base and drawn at the carcass line.

3. The pneumatic radial tire according to claim 1, wherein the stress relieving groove has a width which is so wide that the groove does not substantially close even when the tire is subjected to deformation under load subjected to the tire when it runs.

4. The pneumatic radial tire according to claim 1, wherein the stress relieving groove has a depth which corresponds to 25% to 50% of the total rubber thickness measured along a normal line passing through the groove base and drawn at the carcass line, the groove base being distant apart from the toroidal carcass by a thin side rubber and base rubber.

5. The pneumatic radial tire according to claim 1, wherein said base rubber has a resilience value within a range between 60% and 85%.

6. The pneumatic radial tire according to claim 1, wherein said base rubber extends from one side portion through the belt layer to the other side portion.

7. The pneumatic radial tire according to claim 1, wherein said base rubber is wedge-shaped and extending from the side portion to the crown portion and inserted between the belt layer and the toroidal carcass.

8. The pneumatic radial tire according to claim 1, wherein said rubber filler is formed of a hard rubber having a dynamic modulus of elasticity of 300 kg/cm$^2$ to 1,500 kg/cm$^2$.

* * * * *